US006963362B1

(12) United States Patent
Nakayama (10) Patent No.: US 6,963,362 B1
(45) Date of Patent: Nov. 8, 2005

(54) IMAGE PICKUP APPARATUS HAVING FLASH AND COLOR ADJUSTMENT CONTROL

(75) Inventor: Satoshi Nakayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/361,152

(22) Filed: Jul. 27, 1999

(30) Foreign Application Priority Data

Jul. 30, 1998 (JP) .................................. 10-215694

(51) Int. Cl.[7] ...................... H04N 9/73; H04N 5/222; H04N 9/64; G03F 3/08
(52) U.S. Cl. .................. 348/224.1; 348/371; 348/649; 358/520
(58) Field of Search ................................ 348/370, 371, 348/223.1, 224.1, 225.1, 216.1, 217.1, 229.1, 348/665, 649; 358/509, 510, 520, 475; 396/161, 396/166; 382/167

(56) References Cited

U.S. PATENT DOCUMENTS

| 4,847,680 | A | * | 7/1989 | Okino ...................... 348/224.1 |
| 5,016,039 | A | * | 5/1991 | Sosa et al. ...................... 396/50 |
| 5,016,094 | A | * | 5/1991 | Kaneko ...................... 348/226.1 |
| 5,099,313 | A | * | 3/1992 | Suemoto et al. .......... 348/226.1 |
| 5,289,268 | A | * | 2/1994 | Suzuki et al. ............ 348/223.1 |
| 5,392,068 | A | * | 2/1995 | Suzuki et al. ............ 348/227.1 |
| 5,481,302 | A | * | 1/1996 | Yamamoto et al. ....... 348/223.1 |
| 5,539,456 | A | * | 7/1996 | Ishii ........................ 348/224.1 |
| 5,568,194 | A | * | 10/1996 | Abe .......................... 348/223.1 |
| 5,602,412 | A | * | 2/1997 | Suzuki et al. ................ 257/432 |
| 5,617,139 | A | * | 4/1997 | Okino ....................... 348/223.1 |
| 5,691,772 | A | * | 11/1997 | Suzuki ..................... 348/223.1 |
| 5,808,681 | A | * | 9/1998 | Kitajima ..................... 348/371 |
| 6,072,526 | A | * | 6/2000 | Hashimoto et al. ....... 348/223.1 |
| 6,256,067 | B1 | * | 7/2001 | Yamada ..................... 348/370 |
| 6,459,449 | B1 | * | 10/2002 | Juen ......................... 348/223.1 |
| 6,476,820 | B1 | * | 11/2002 | Harada et al. .............. 345/589 |

FOREIGN PATENT DOCUMENTS

| JP | 61128694 | A | * | 6/1986 | ............ H04N 9/73 |
| JP | 06130470 | A | * | 5/1994 | .......... G03B 15/05 |
| JP | 07240929 | A | * | 9/1995 | ............ H04N 9/04 |

* cited by examiner

Primary Examiner—Wendy R. Garber
Assistant Examiner—John M. Villecco
(74) Attorney, Agent, or Firm—Fitzpatrick, Cella, Harper & Scinto (57) ABSTRACT

A camera for use with a flash apparatus is capable of achieving excellent color balance when a picture is taken using the flash apparatus. The camera comprises a flash control circuit that controls the amount of light generated by the flash apparatus, and a color adjusting circuit including a linear matrix circuit and a gain control circuit that controls hues or color saturation. A color correcting circuit controls the color adjusting circuit such that the hue or color saturation is properly adjusted in accordance with the amount of light determined by the flash control circuit.

26 Claims, 6 Drawing Sheets

FIG. 1

IDEAL COLOR BALANCE

FIG. 2A

COLOR BALANCE
UNDER ILLUMINATION
OF INCANDESCENT LAMP

FIG. 2B

COLOR BALANCE
UNDER ILLUMINATION
OF FLUORESCENT LAMP

FIG. 2C

COLOR BALANCE OBTAINED
UNDER ILLUMINATION
OF INCANDESCENT LAMP

FIG. 3A

AFTER COLOR BALANCE
CORRECTION

FIG. 3B

COLOR BALANCE OBTAINED
UNDER ILLUMINATION OF
FLASH APPARATUS

FIG. 3C

COLOR BALANCE OBTAINED
AFTER READJUSTMENT

IMAGE PICKUP APPARATUS HAVING FLASH AND COLOR ADJUSTMENT CONTROL

BACKGROUND OF THE INVENTION

1. Field of the Invention

The present invention relates to an image pickup apparatus capable of using a flash apparatus.

2. Description of the Related Art

In an image pickup apparatus such as an electronic camera, it is required to use a flash apparatus (flash) when a picture of a subject is taken in a low ambient light environment or in a backlighted situation.

It is also required to adjust the white balance in accordance with the color temperature of a subject. However, in the case where artificial lighting is employed, color rendering is poor and thus correction of only the white balance is not sufficient to obtain good color balance in many cases. In view of the above, various techniques have been proposed for correcting a hue or chroma saturation depending on the white balance. Some of those conventional techniques are described below with reference to the drawings.

Figure 6:
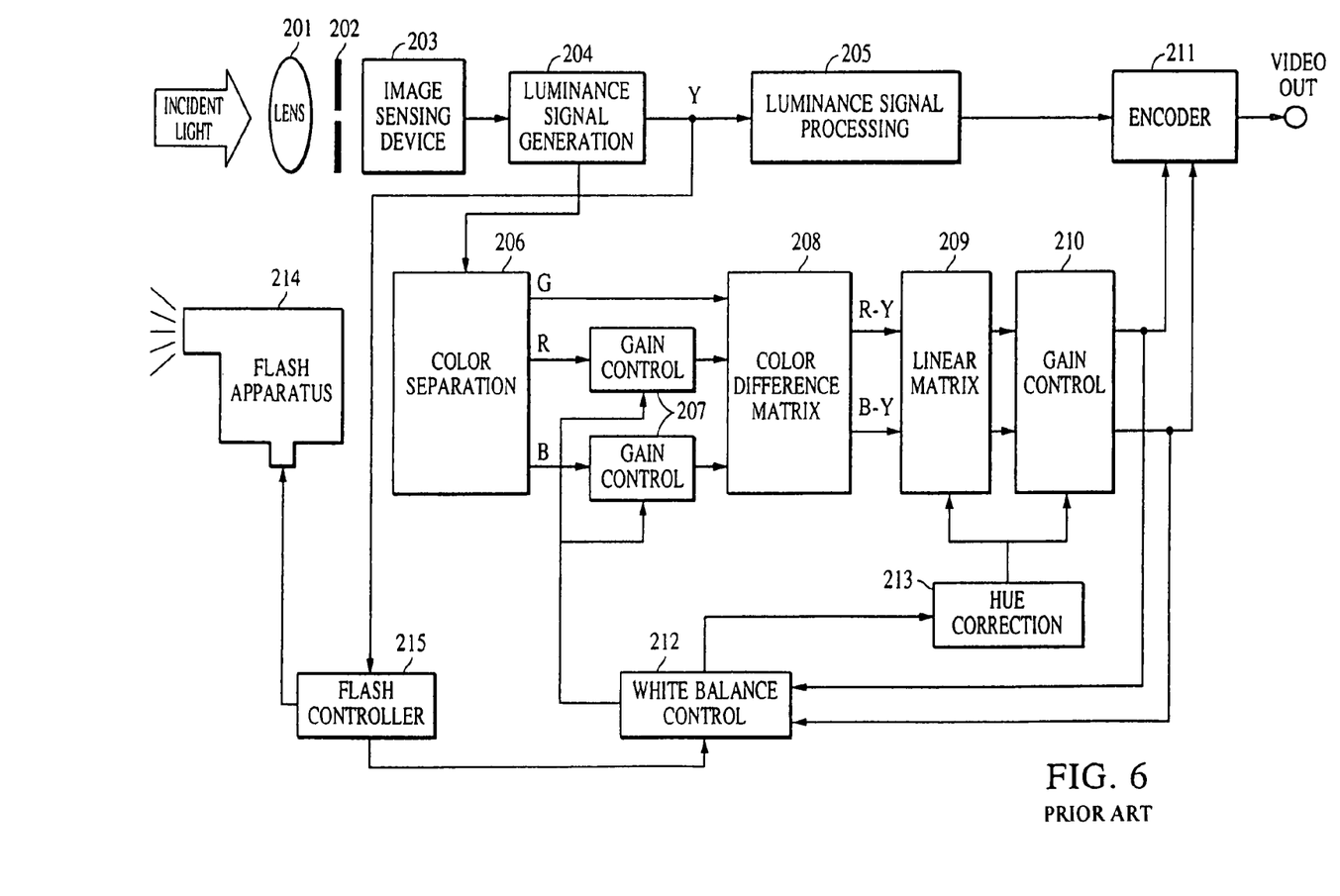
FIG. 6 is a block diagram illustrating a conventional technique.

FIG. 6 is a block diagram illustrating an image sensing system used in a conventional electronic camera. As shown, the image sensing system include a lens 201, an iris diaphragm 202, an image sensing device 203, a luminance signal generating circuit 204 for generating a luminance signal in accordance with the output of the image sensing device, a luminance signal processing circuit 205 for performing processing such as gamma processing and edge enhancement, a color separation circuit 206 for generating color signals associated with three colors R, G, and B, a white balance amplifier 207 for controlling the white balance by adjusting the gains associated with the R-signal and B-signal, a color difference matrix circuit 208 for generating color difference signals R-Y and B-Y from the R-, G- and B-signals output from the white balance amplifier 207, a linear matrix circuit 209 for adjusting the hue, a color difference gain control circuit 210 for adjusting the color saturation by controlling the gains of the color difference signals R-Y and B-Y, an encoder 211 for generating a video signal from the luminance signal and the color difference signals, a white balance control circuit 212 for extracting color temperature information from the color difference signals and controlling the gain of the white balance amplifier 207, a hue correcting circuit 213 for correcting the hue and the chroma saturation based on the white balance information supplied from the white balance control circuit 212, a flash apparatus 214, and a flash control circuit 215 for controlling the timing and the amount of light generated by the flash apparatus 214.

Light incident on the lens 201 is passed through the iris diaphragm 202 and adjusted as to control the amount of exposure. The light then falls on the image sensing device 203. The image sensing device 203 converts the received light to a corresponding electric charge and accumulates it. The image signal output from the image sensing device 203 is separated by the luminance signal generating circuit 204 into a luminance signal Y and a color signal. The resultant luminance signal Y is applied to the luminance signal processing circuit 205 and subjected to processing such as gamma processing and edge enhancement.

On the other hand the color signal is applied to the color separation circuit 206 and separated into three color signals R, G, and B. The white balance amplifier 207 makes a white balance adjustment on the R-, G-, and B-signals and also performs gamma processing on them. The resultant R-, G-, and B-signals are applied to the color difference matrix circuit 208 and converted into color difference signals R-Y and B-Y. The resultant color difference signals R-Y and B-Y are applied to the linear matrix circuit 209 and adjusted in terms of the hue.

The signals output from the linear matrix circuit 209 are applied to the color difference gain control circuit 210 and the gains of the respective color difference signals R-Y and B-Y are adjusted. The resultant signals output from the color difference gain control circuit 210 are applied to the encoder 211 and encoded into a video signal. The signals output from the color difference gain control circuit 210 are also supplied to the white balance control circuit 212. The white balance control circuit 212 detects the color temperature from the color difference signals. The white balance control circuit 212 then calculates the gain of the white balance amplifier 207 in accordance with the detected color temperature and controls the white balance.

The flash control circuit 215 controls the flash apparatus 214 such that light is generated by the flash apparatus 214 during a charge accumulation period of the image sensing device 203, wherein the amount of light is controlled in accordance with the luminance signal Y.

The color temperature of a subject varies depending on the type of a light source. When artificial lighting is employed, color rendering is poor and thus correction of only the white balance is not sufficient to obtain good color balance in many cases. Therefore it is required to correct also the hue and the chroma saturation depending on the white balance.

Thus, the white balance control circuit 212 supplies white balance correction information to the hue correcting circuit 213. The hue correcting circuit 213 calculates an optimum hue from the white balance information and controls the linear matrix circuit 209 and the color difference gain control circuit 210 so as to obtain the optimum hue. Herein, the output signals of the linear matrix circuit 209 are given by:

$$(R-Y)'=(R-Y)+\alpha(B-Y) \quad (-1<\alpha<1) \tag{1}$$

$$(B-Y)'=(B-Y)+\beta(R-Y) \quad (-1<\beta 1) \tag{2}$$

Thus, it is possible to adjust the hue of the color difference signals by varying factors α and β, in equations (1) and (2), of the linear matrix circuit 209. That is, the hue correcting circuit 213 corrects the hue by adjusting α and β associated with the linear matrix circuit 209.

In the case where the flash apparatus 214 is used, it is required to correct the white balance depending on the intensity of ambient light and the amount of light generated by the flash apparatus 214. The flash control circuit 215 supplies information representing the intensity of ambient light determined from the luminance signal Y and also representing the amount of light generated by the flash apparatus 215 to the white balance control circuit 212. In accordance with the received information, the white balance control circuit 212 controls the white balance for an image taken using the flash apparatus 214.

In the above-described conventional image pickup apparatus, although the white balance can be corrected for an image taken using the flash apparatus, the hue or chroma saturation is not adjusted in accordance with the color rendering of the flash.

Figure 5A:
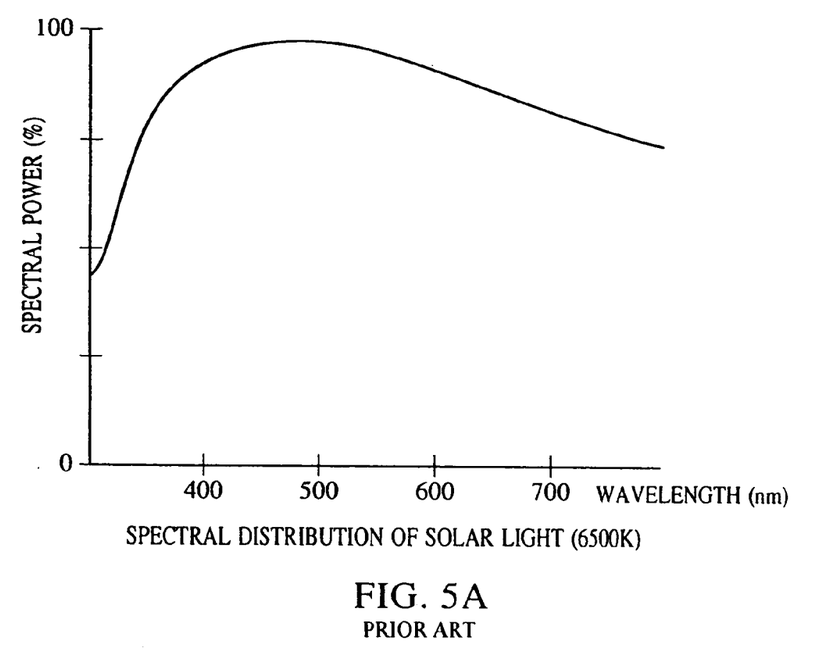
FIGS. 5A and 5B are graphs illustrating a spectral distribution of ambient light and light generated by a flash apparatus, respectively.
Figure 5B:
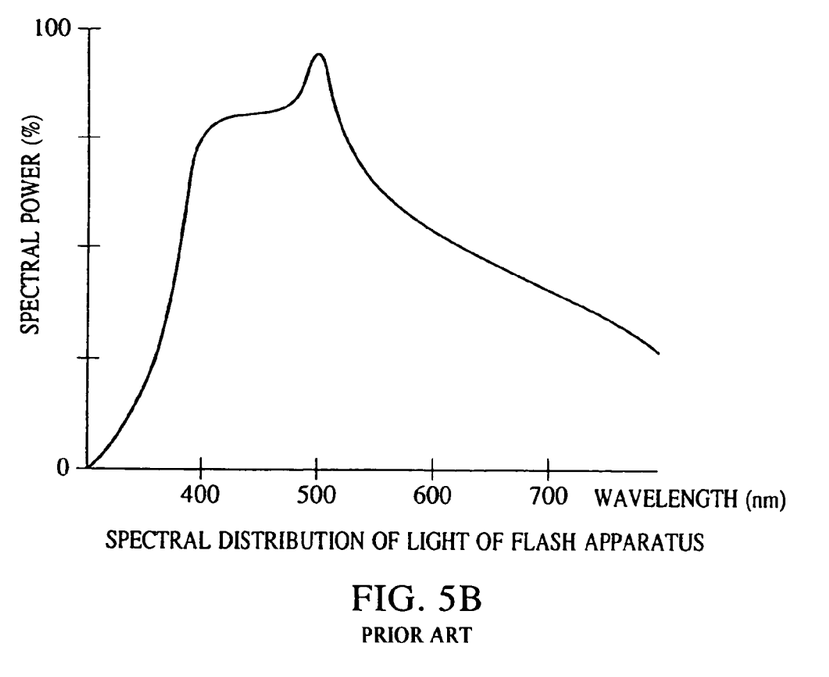

FIGS. 5A and 5B illustrate spectral distributions of solar light and flash light, respectively. As can be seen from FIGS. 5A and 5B, the color rendering of the flash is lower than that of the solar light. This causes not only a difference in color temperature but also a difference in color balance.

This means that when a picture is taken using a flash apparatus under conditions in terms of hues optimized for solar light, it is not always possible to achieve good color balance.

SUMMARY OF THE INVENTION

Thus, an object of the present invention is to provide an image pickup apparatus capable of achieving optimum color balance when a picture is taken using a flash apparatus.

According to an aspect of the present invention, to achieve the above object, there is provided an image pickup apparatus using a flash apparatus (flash apparatus 114 in embodiments described later), comprising: amount-of-light controlling means (flash control circuit 115 in the embodiments described later) for controlling the amount of light generated by the flash apparatus; color adjusting means (linear matrix circuit 109 and/or gain control circuit 110 in the embodiments described later) for controlling a hue or color saturation; and first hue controlling means (color correcting circuit B 116 in the embodiments described later) for controlling the color adjusting means such that the hue or color saturation is corrected in accordance with the amount of light determined by the amount-of-light controlling means.

Preferably, the above-described image pickup apparatus further comprises color temperature detecting means (white balance control circuit 112 in the embodiments described later) for detecting the color temperature of a subject; and second hue controlling means (color correcting circuit A 113 in the embodiments described later) for controlling the color adjusting means in accordance with the color temperature of the subject, wherein the first hue controlling means corrects the correction result of the second hue controlling means.

In the above-described image pickup apparatus according to the present invention, the color adjusting means may include a matrix circuit (linear matrix circuit 109 in the embodiments described later) which multiplies a first color difference signal (R-Y in the embodiments described later) by a factor and adds the result to a second color difference signal (B-Y in the embodiments described later) and which multiplies the second difference signal by a factor and adds the result to the first color difference signal.

According to another aspect of the present invention, there is provided an image pickup apparatus using a flash apparatus (flash apparatus 114 in the embodiments described later), comprising: illuminance detecting means (luminance signal generating circuit 104 in the embodiments described later) for detecting the illuminance of a subject; color adjusting means (linear matrix circuit 109 and/or gain control circuit 110 in the embodiments described later) for controlling a hue or color saturation; and first hue controlling means (color correcting circuit B 116 in the embodiments described later) for controlling the color adjusting means such that the hue or color saturation is corrected in accordance with the illuminance detected by the illuminance detecting means.

Preferably, the above-described image pickup apparatus further comprises color temperature detecting means (white balance control circuit 112 in the embodiments described later) for detecting the color temperature of a subject; and second hue controlling means (color correcting circuit A 113 in the embodiments described later) for controlling the color adjusting means in accordance with the color temperature of the subject, wherein the first hue controlling means makes a correction on a value corrected by the second hue controlling means.

In the above-described image pickup apparatus according to the present invention, the color adjusting means may include a matrix circuit (linear matrix circuit 109 in the embodiments described later) which multiplies a first color difference signal (R-Y in the embodiments described later) by a factor and adds the result to a second color difference signal (B-Y in the embodiments described later) and which multiplies the second difference signal by a factor and adds the result to the first color difference signal.

According to still another aspect of the present invention, there is provided an image pickup apparatus using a flash apparatus (flash apparatus 114 in the embodiments described later), comprising: color temperature detecting means (white balance control circuit 112 in the embodiments described later) for detecting the color temperature of a subject; illuminance detecting means (luminance signal generating circuit 104 in the embodiments described later) for detecting the illuminance of a subject; amount-of-light controlling means (flash control circuit 115 in the embodiments described later) for controlling the amount of light generated by the flash apparatus; color adjusting means (linear matrix circuit 109 and/or gain control circuit 110 in the embodiments described later) for controlling hue or color saturation; first hue controlling means (color correcting circuit A 113 in the embodiments described later) for controlling a hue or color saturation in accordance with the color temperature of a subject detected by the color temperature detecting means; and second hue controlling means (color correcting circuit B 116 in the embodiments described later) for controlling the color adjusting means such that the hue or color saturation is corrected in accordance with the illuminance detected by the illuminance detecting means and also in accordance with the amount of light determined by the amount-of-light controlling means.

In the above-described image pickup apparatus according to the present invention, the color adjusting means may include a matrix circuit (linear matrix circuit 109 in the embodiments described later) which multiplies a first color difference signal (R-Y in the embodiments described later) by a factor and adds the result to a second color difference signal (B-Y in the embodiments described later) and which multiplies the second difference signal by a factor and adds the result to the first color difference signal.

According to still another aspect of the present invention, there is provided an image pickup apparatus capable of using a flash apparatus (flash apparatus 114 in the embodiments described later), comprising: color adjusting means (linear matrix circuit 109 and/or gain control circuit 110 in the embodiments described later) for controlling hue or color saturation; color temperature detecting means (white balance control circuit 112 in the embodiments described later) for detecting the color temperature of a subject; first hue controlling means (color correcting circuit A 113 in the embodiments described later) for controlling the color adjusting means in accordance with the color temperature of a subject detected by the color temperature detecting means; memory means (memory 117 in the embodiments described later) for storing hue information used to make a color correction when the flash apparatus is used; and second hue controlling means (color correcting circuit B 116 in the embodiments described later) for controlling the color adjusting means in accordance with the hue information stored in the memory means such that the hue information for the flash apparatus is selected when the flash apparatus is used.

In the above-described image pickup apparatus according to the present invention, the color adjusting means may include a matrix circuit (linear matrix circuit 109 in the embodiments described later) which multiplies a first color difference signal (R-Y in the embodiments described later) by a factor and adds the result to a second color difference signal (B-Y in the embodiments described later) and which multiplies the second difference signal by a factor and adds the result to the first color difference signal.

According to still another aspect of the present invention, there is provided an image pickup apparatus using a flash apparatus (flash apparatus 114 in the embodiments described later), comprising: white balance controlling means (white balance control circuit 112 in the embodiments described later) for controlling white balance in accordance with the illuminance of a subject or the amount of light generated by the flash apparatus; color adjusting means (linear matrix circuit 109 and/or gain control circuit 110 in the embodiments described later) for controlling hue or color saturation; and hue controlling means (color correcting circuit A 113 and color correcting circuit B 116 in the embodiments described later) and for controlling the color adjusting means in accordance with the white balance information generated by the white balance controlling means such that when white balance information varies in response to the illuminance of the subject or the amount of light generated by the flash apparatus, the hue controlling means controls the color adjusting means in accordance with the white balance information.

In the above-described image pickup apparatus according to the present invention, the color adjusting means may include a matrix circuit (linear matrix circuit 109 in the embodiments described later) which multiplies a first color difference signal by a factor and adds the result to a second color difference signal and which multiplies the second difference signal by a factor and adds the result to the first color difference signal.

According to still another aspect of the present invention, there is provided an image pickup apparatus using a flash apparatus (flash apparatus 114 in the embodiments described later), comprising: color adjusting means (linear matrix circuit 109 and/or gain control circuit 110 in the embodiments described later) for controlling hue or color saturation; and hue controlling means (color correcting circuit 317 in the embodiments described later) for controlling the color adjusting means such that when the flash apparatus is used, the color adjusting means corrects the hue or color saturation.

In the above-described image pickup apparatus according to the present invention, the hue correcting means (color correcting circuit 317 in the embodiments described later) may have correction data (hue data B) associated with the hue or color saturation employed when the flash apparatus is used and also have correction data (hue data B) associated with the hue or color saturation employed when the flash apparatus is not used, and wherein the hue correcting means selects proper correction data depending on whether the flash apparatus is used or not.

BRIEF DESCRIPTION OF THE DRAWINGS

FIG. 3, which includes

DETAILED DESCRIPTION OF THE PREFERRED EMBODIMENTS

The present invention is described in further detail below with reference to preferred embodiments in conjunction with the accompanying drawings.

First Embodiment

Figure 1:
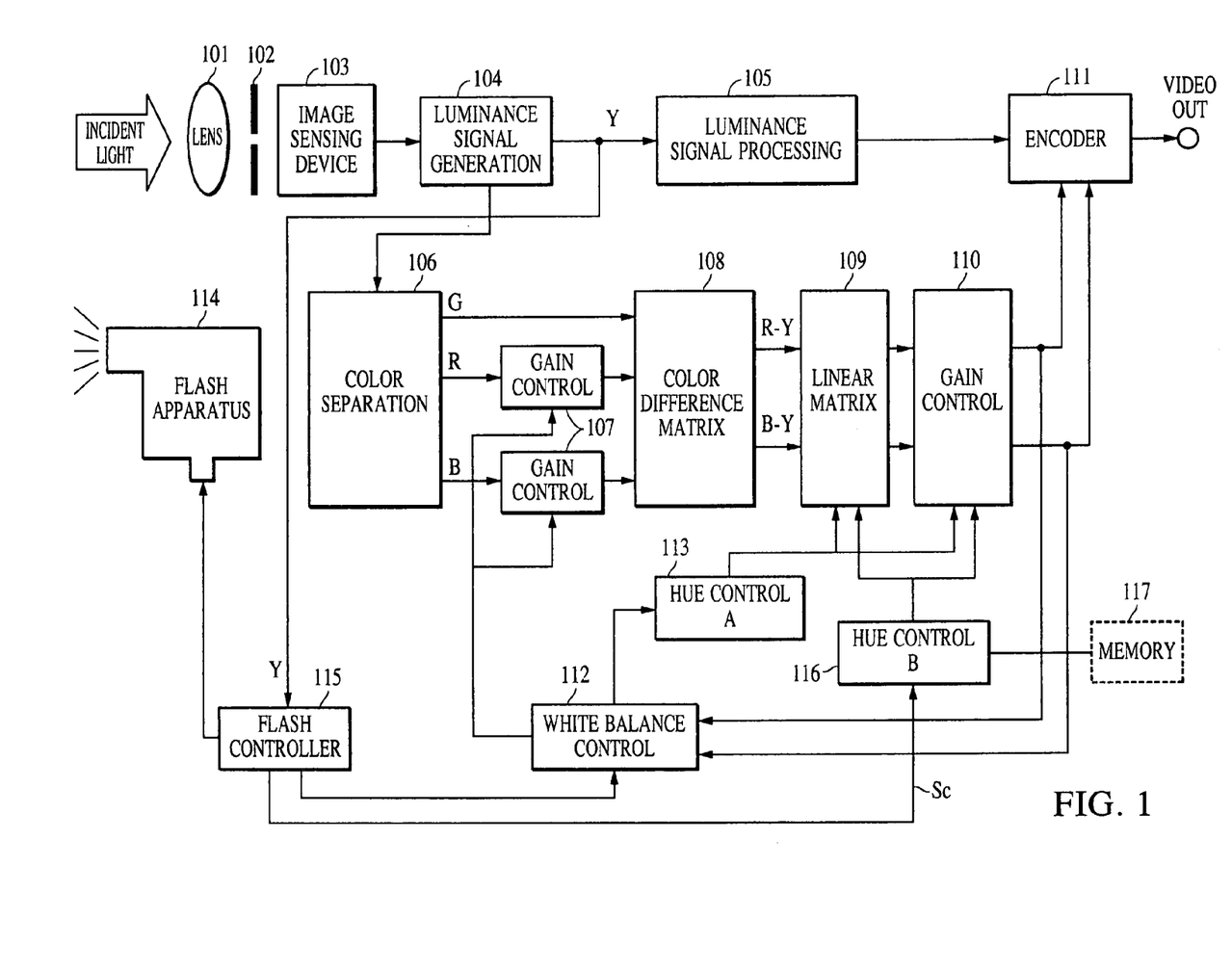
FIG. 1 is a block diagram illustrating a first embodiment of the present invention.

FIG. 1 is a block diagram illustrating an image pickup apparatus embodying the present invention, in which good color balance can be achieved when a picture is taken using a flash apparatus.

As shown in FIG. 1, the image pickup apparatus includes an imaging lens 101, an iris diaphragm 102, an image sensing device 103, a luminance signal generating circuit 104 for generating a luminance signal in accordance with the output of the image sensing device 103, a luminance signal processing circuit 105 for performing processing such as gamma processing and edge enhancement, a color separation circuit 106 for generating color signals associated with three colors R, G, and B, a white balance amplifier 107 for controlling the white balance by adjusting the gains associated with the R-signal and B-signal, a color difference matrix circuit 108 for generating color difference signals R-Y and B-Y from the R-, G- and B-signals output from the white balance amplifier 107, a linear matrix circuit 109 which receives the color difference signals R-Y and B-Y from the color difference matrix circuit 108 and makes an adjustment thereon, a color difference gain control circuit 110 for adjusting the color saturation by controlling the gains of the color difference signals R-Y and B-Y, an encoder 111 for generating a video signal from the luminance signal and the color difference signals, a white balance control circuit 112 for extracting color temperature information from the color difference signals and controlling the gain of the white balance amplifier 107, a hue correcting circuit A 113 for correcting the hue and the chroma saturation based on the white balance information supplied from the white balance control circuit 112, a flash apparatus 114, a flash control circuit 115 for controlling the timing and the amount of light generated by the flash apparatus 114, and a hue correcting circuit B 116 for correcting the hue and the chroma saturation based on the information representing the amount of light generated by the flash apparatus supplied from the flash control circuit 115.

The flow of signals among blocks 101–115 and the operations of these blocks are similar to those for blocks 201–215 shown in FIG. 6.

The flash control circuit 115 supplies information about the illuminance of a subject obtained from the luminance signal and information about the amount of light generated by the flash apparatus 114 to the white balance control circuit 112 and the color correcting circuit B 116.

When the flash apparatus 114 is used, the white balance control circuit 112 controls the white balance based on the illuminance of the subject and the amount of light generated by the flash apparatus 114 as in the conventional image pickup apparatus described earlier.

The color correcting circuit B 116 is an essential part that characterizes the present embodiment. That is, the color correcting circuit B 116 corrects the color balance of an image taken using the flash apparatus 114, in accordance with the subject's illuminance determined from the signal level of the luminance signal Y supplied via the flash control circuit 115 and also in accordance with the amount of light generated by the flash apparatus 114 wherein the correction of the color balance is performed by controlling the linear matrix circuit 109 and the color difference gain control circuit 110.

Figure 2A:
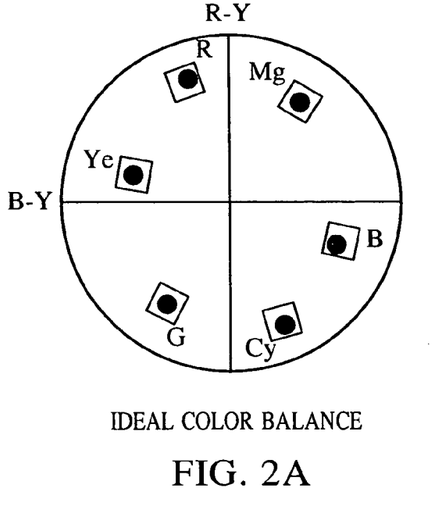
FIGS. 2A to 2C are vector diagrams illustrating color balance for various types of light sources.
Figure 2B:
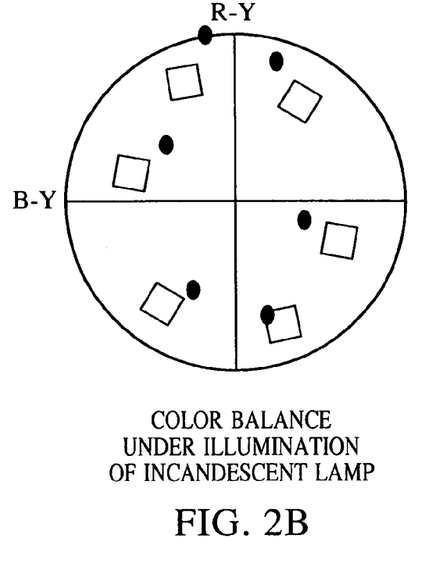
Figure 2C:
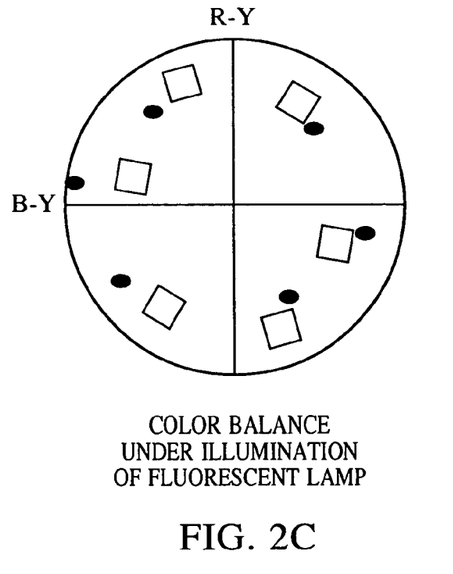

FIGS. 2A to 2C are vector diagrams in the color difference coordinates R-Y and B-Y, illustrating a shift in color balance which occurs when an image is taken under illumination from an incandescent lamp and a shift which occurs when the image is taken under illumination from a fluorescent tube, where FIG. 2A is a vector diagram of a color bar chart photographed under illumination of an ideal light source, FIG. 2B is a vector diagram of a color bar chart photographed under illumination from an incandescent lamp, and FIG. 2C is a vector diagram of a color bar chart photographed under illumination from a fluorescent tube.

In these figures, open rectangles denote vectors in color difference coordinates for each color of the color bar charts photographed, and shaded circles or ellipses denote vectors for color signals detected.

FIG. 2A illustrates color difference vectors obtained when the color bar chart is photographed under ideal illumination. In this case, original colors are reproduced faithfully.

In the case of FIG. 2B, in which illumination is provided by an incandescent lamp, expansion in R and contraction in Ye occur with respect to the color difference vectors obtained under ideal illumination.

On the other hand, under illumination provided by a fluorescent tube, as shown in FIG. 2C, contraction in R and expansion in Ye occur with respect to the color difference vector obtained under ideal illumination. These shifts in the color balance are corrected by the hue correcting circuit 213 in the conventional image pickup apparatus while the shifts are corrected by the hue correcting circuit A113 in the present embodiment of the present invention.

Figure 3A:
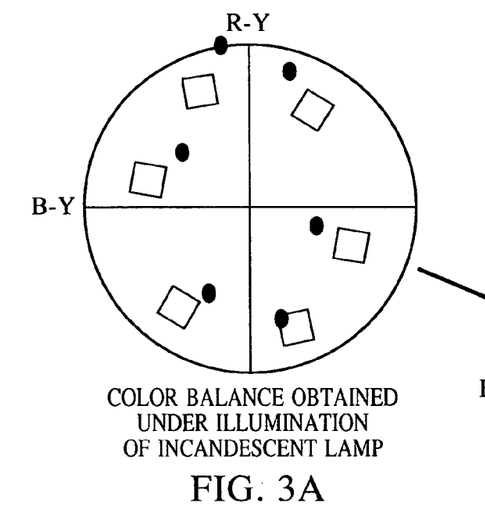
FIGS. 3A to 3D, is a conceptual representation of a color balance correction operation according to the first embodiment of the present invention.
Figure 3B:
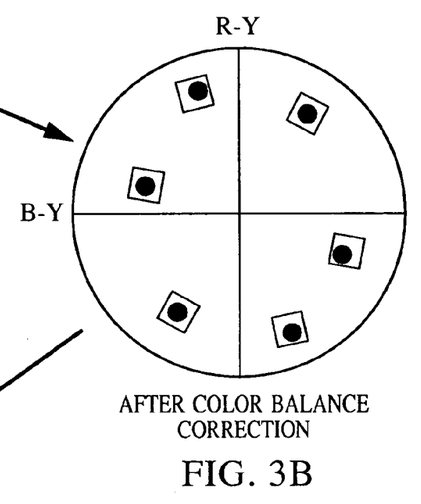

FIG. 3, including FIGS. 3A to 3D, illustrates a process of correcting the shift in the color balance which occurs when an incandescent lamp is used. FIG. 3A shows a vector diagram of color balance obtained when the white balance is adjusted under illumination of the incandescent lamp without making any color balance correction. FIG. 3B shows a vector diagram obtained by further making a color balance correction. In this case, the correction is made by compressing R-Y and expanding B-Y. In addition, a linear matrix correction is also made.

Figure 3C:
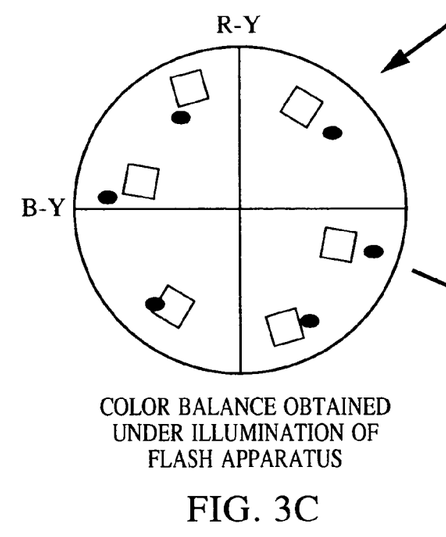

FIG. 3C shows a vector diagram obtained when a picture is taken using the light of a flash apparatus under the conditions determined in FIG. 3B.

Because the light of a flash apparatus has a spectrum closer to that which results in ideal color balance than an incandescent lamp, the correction of the color balance in accordance with the conditions determined under illumination from an incandescent lamp as shown in FIG. 3B results in a shift from the ideal color balance.

The color balance varies depending on the intensity of the ambient light and the intensity of the light from the flash apparatus. More specifically, when the intensity of the light from the flash apparatus is weak, the color balance becomes similar to that obtained under illumination from an incandescent lamp, while the color balance becomes similar to that obtained under illumination from a flash apparatus when the intensity of the light of the flash apparatus is high.

Figure 3D:
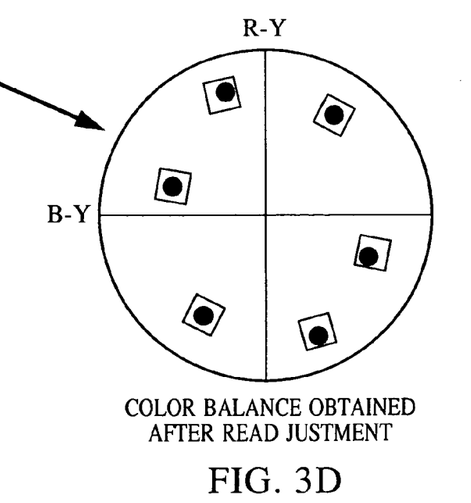

FIG. 3D shows a color balance obtained by making a further correction on the conditions shown in FIG. 3C. By multiplying the intensity of the ambient light in the conditions shown in FIG. 3C by a correction factor calculated from the amount of light from the flash apparatus, it is possible to achieve optimum balance for various subjects and for various amounts of light from the flash apparatus.

That is, depending the ratio of the amount of light from the flash apparatus to the intensity of the ambient light, the ratio of the correction associated with an incandescent lamp and the correction associated with the light from the flash apparatus is precisely calculated so as to obtain an optimum color balance.

Thus, the correction value associated with the color balance for the case where an incandescent lamp is used is determined in accordance with the intensity of the ambient light and the amount of light from the flash apparatus thereby correcting the color balance shown in FIG. 3A so as to obtain the color balance shown in FIG. 3B, and the correction value for the case where the flash apparatus is used is determined in accordance with the intensity of the ambient light and the amount of light from the flash apparatus and also in accordance with the ratio of the intensity of light from the flash apparatus to the intensity of the ambient light, thereby correcting the color balance shown in FIG. 3C so as to obtain the color balance shown in FIG. 3D. Thus, optimum color balance can be obtained for both cases.

Although in the above description, the correcting process is performed sequentially starting from the step shown in FIG. 3A to the step shown in FIG. 3D, it is possible to directly obtain conditions shown in FIG. 3D in accordance with the intensity of the ambient light and the calculated amount of light from the flash apparatus.

As can be seen from the above description, when an image is taken using the flash apparatus, it is possible to achieve an optimum color balance for any condition associated with the flash by correcting the color balance in accordance with the intensity of the ambient light and the amount of light generated by the flash apparatus.

Although in the present embodiment described above, the color balance is corrected based on both the intensity of the ambient light and the amount of light from the flash apparatus, it may be possible to correct the color balance based on either one of the intensity of the ambient light and the intensity of the light from the flash apparatus. That is, when an image is taken, whether the flash apparatus should be used or not may be determined in accordance with the intensity of the ambient light, and the intensity of light to be generated by the flash apparatus may be calculated in accordance with the intensity of the ambient light, and thus the color balance may be properly controlled in accordance with the intensity of the ambient light. Alternatively, the color balance may be controlled in accordance with the amount of light actually generated by the flash apparatus.

The correction values of the color balance may be stored in the memory 117, as represented by a broken line in FIG. 1, in the form of a table of data determined as a function of the amount of light generated by the flash apparatus. The correction value may also be calculated by means of linear interpolation.

The correction as to white balance is not essential to the present invention. That is, the correction described above may be possible based only on correction values determined for the light generated by the flash apparatus. Furthermore, although the color balance is corrected using a linear matrix circuit in the present embodiment, another hue adjustment means may be employed.

Second Embodiment

Figure 4:
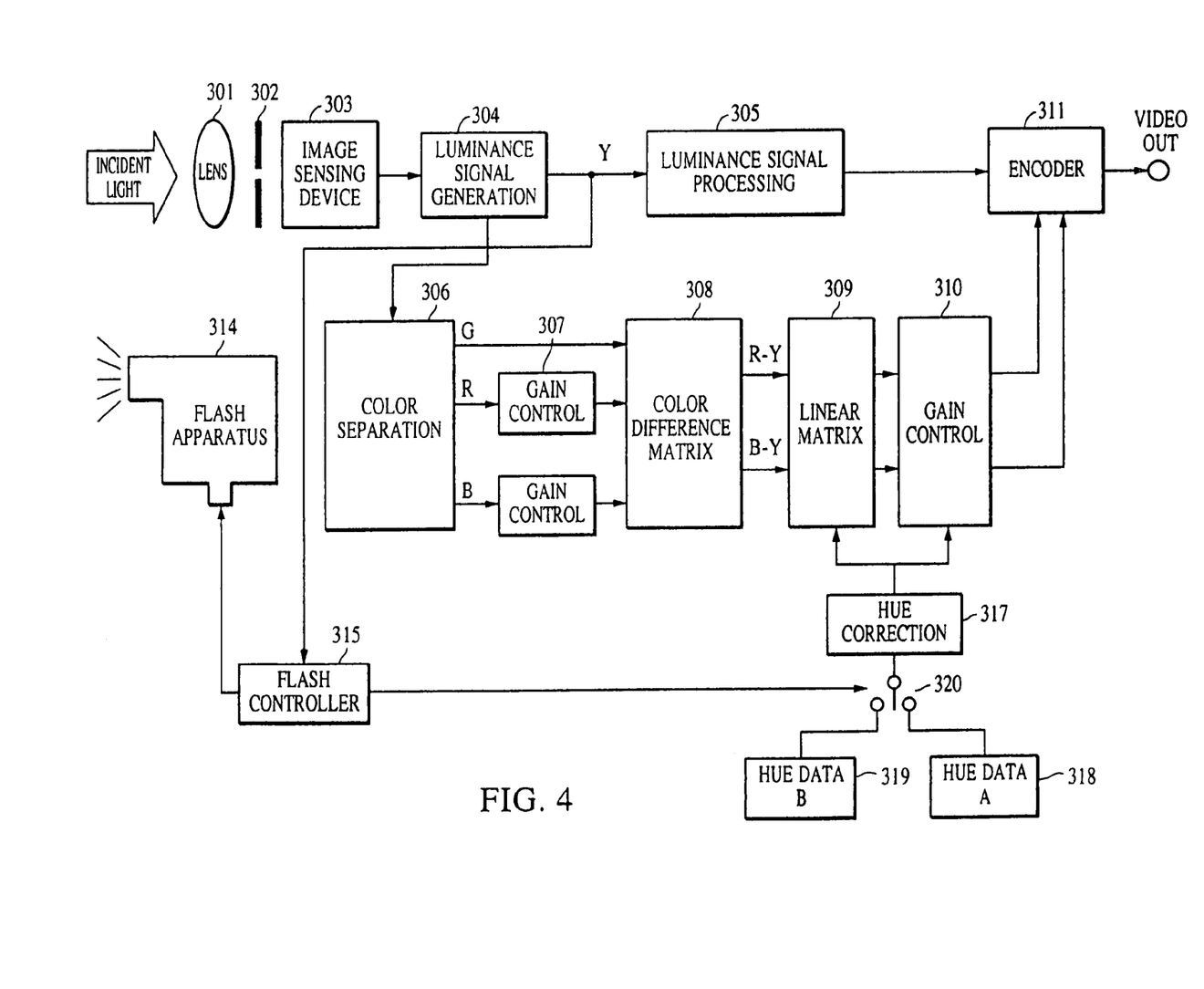
FIG. 4 is a block diagram illustrating a second embodiment of the present invention.

FIG. 4 is a block diagram illustrating a second embodiment of an image pickup apparatus according to the present invention, in which when a picture is taken using a flash apparatus, the color balance is simply corrected in accordance with correction data prepared for use with the flash apparatus.

Elements 301–311 shown in FIG. 4 correspond to elements 101–111, respectively, shown in FIG. 1 and elements 314 and 315 shown in FIG. 4 correspond to elements 114 and 115, respectively, shown in FIG. 1. Reference numeral 317 denotes a hue correcting circuit for controlling a hue correcting process in accordance with hue data. Reference numeral 318 denotes a source of hue data A (e.g., a portion of memory) employed when the flash apparatus is not used and reference numeral 319 denotes a source of hue data B (e.g., a portion of memory) employed when the flash is used. Reference numeral 320 denotes a switch for switching between the source of hue data A 318 and the source of hue data B 319.

In FIG. 4, the video signal flows in a similar manner to the first embodiment. The flash control circuit 315 controls the switch 320 such that the switch 320 selects hue data A 318 when the flash apparatus is not used, while the switch 320 selects hue data B 319 when the flash apparatus is used.

Color rendering obtained when the flash apparatus is used is described below. FIGS. 5A and 5B illustrate spectral distributions of solar light and light from a flash apparatus, respectively. FIG. 5A illustrates a spectral distribution of solar light on which the color rendering is based. That is, hues are generally determined such that a color bar chart photographed under illumination of solar light has optimum color balance. The hue data A 318 represents such hues. FIG. 5B illustrates a spectral distribution of light generated by the flash apparatus. As can be seen, the flash provides relatively high color rendering although not as high as 100%.

The hue data B 319 represents hues which give optimum color balance when the color bar chart is photographed using the flash apparatus.

By employing the color balance data prepared for use in photographing with the flash apparatus, as described above, it becomes possible to achieve optimum color balance when a picture is taken using the flash apparatus.

In the present embodiment, when a picture is taken without using the flash apparatus, the hue data optimized for solar light is employed. However, hue data optimized for another light source other than solar light may also be employed. A plurality of hue data may be prepared so that proper hue data may be selected depending on a factor other than the flash. Furthermore, although the color balance correction is performed using a linear matrix circuit in the present embodiment, another hue adjustment means may be employed.

As described above, the present invention provides a technique for achieving optimum color balance when a picture is taken using a flash apparatus by switching the settings associated with the hue or color saturation in accordance with either one or both of the amount of light generated by the flash apparatus and the intensity of ambient light.

The present invention also provides a technique for achieving optimum color balance when a picture is taken using the flash apparatus by switching the settings associated with the hue or color saturation in accordance with white balance information so as to adjust the white balance depending on the amount of light generated by the flash apparatus and the intensity of the ambient light.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image pickup apparatus for use with a flash apparatus, comprising:
   a control circuit which determines an amount of light generated by the flash apparatus;
   a color adjusting circuit which controls at least one of hue and a color saturation; and
   a first color control circuit which controls said color adjusting circuit such that at least one of the hue and the color saturation is corrected responsive to the amount of the flash apparatus generated light determined by said control circuit, independently of hue and/or color saturation control in accordance with white balance.

2. An image pickup apparatus according to claim 1, further comprising:
   a color temperature detecting circuit which detects a color temperature of a subject; and
   a second color controlling circuit which controls said color adjusting circuit such that at least one of hue and color saturation is corrected in accordance with the color temperature of the subject detected by said color temperature detecting circuit,
   wherein said first color controlling circuit corrects a correction result of said second color controlling circuit.

3. An image pickup apparatus according to claim 1, wherein said color adjusting circuit includes a matrix circuit which multiplies a first color difference signal by a factor and adds the result to a second color difference signal and which multiplies the second color difference signal by a factor and adds the result to the first color difference signal.

4. An image pickup apparatus according to claim 1, wherein said image pickup apparatus comprises the flash apparatus.

5. An image pickup apparatus for use with a flash apparatus, comprising:
   an illuminance detecting circuit which detects an illuminance of light incident from a subject;
   a color adjusting circuit which controls at least one of a hue and a color saturation; and
   a first controlling circuit which controls said color adjusting circuit such that at least one of the hue and color saturation is corrected, responsive to the illuminance of the light incident from the subject detected by said illuminance detecting circuit, independently of hue and/or color saturation control in accordance with white balance.

6. An image pickup apparatus according to claim 5, further comprising:
a color temperature detecting circuit which detects a color temperature of the subject; and
a second color controlling circuit which controls said color adjusting circuit in accordance with the color temperature of the subject detected by said color temperature detecting circuit,
wherein said first color controlling circuit corrects a correction result of said second color controlling circuit.

7. An image pickup apparatus according to claim 5, wherein said color adjusting circuit includes a matrix circuit which multiplies a first color difference signal by a factor and adds the result to a second color difference signal and which multiplies the second color difference signal by a factor and adds the result to the first color difference signal.

8. An image pickup apparatus according to claim 5, wherein said image pickup apparatus comprises the flash apparatus.

9. An image pickup apparatus for use with a flash apparatus, comprising:
a color temperature detecting circuit which detects a color temperature of a subject;
an illuminance detecting circuit which detects an illuminance of a subject;
a control circuit which determines an amount of light generated by the flash apparatus;
a color adjusting circuit which controls at least one of hue and color saturation;
a first color controlling circuit which controls at least one of hue and color saturation in accordance with the color temperature of a subject detected by said color temperature detecting circuit; and
a second color controlling circuit which controls said color adjusting circuit such that at least one of hue and color saturation is corrected in accordance with at least one of the illuminance detected by said illuminance detecting circuit and the amount of light determined by said control circuit.

10. An image pickup apparatus according to claim 9, wherein said color adjusting circuit includes a matrix circuit which multiplies a first color difference signal by a factor and adds the result to a second color difference signal and which multiplies the second color difference signal by a factor and adds the result to the first color difference signal.

11. An image pickup apparatus according to claim 9, wherein said image pickup apparatus comprises the flash apparatus.

12. An image pickup apparatus for use with a flash apparatus, comprising:
a color adjusting circuit which controls at least one of hue and color saturation;
a color temperature detecting circuit which detects a color temperature of a subject;
a first color controlling circuit which controls said color adjusting circuit in accordance with the color temperature of the subject detected by said color temperature detecting circuit;
a memory which stores hue information used to make a color correction when said flash apparatus is used; and
a second color controlling circuit which controls said color adjusting circuit in accordance with the hue information stored in said memory circuit such that the hue information for said flash apparatus is selected when said flash apparatus is used.

13. An image pickup apparatus according to claim 12, wherein said color adjusting circuit includes a matrix circuit which multiplies a first color difference signal by a factor and adds the result to a second color difference signal and which multiplies the second color difference signal by a factor and adds the result to the first color difference signal.

14. An image pickup apparatus according to claim 12, wherein said image pickup apparatus comprises the flash apparatus.

15. An image pickup apparatus for use with a flash apparatus, comprising:
a white balance controlling circuit which controls white balance in accordance with color temperature;
a color adjusting circuit which controls at least one of hue and color saturation; and
a color control circuit which controls said color adjusting circuit in accordance with an amount of light generated by the flash apparatus.

16. An image pickup apparatus according to claim 15, wherein said color adjusting circuit includes a matrix circuit which multiplies a first color difference signal by a factor and adds the result to a second color difference signal and which multiplies the second color difference signal by a factor and adds the result to the first color difference signal.

17. An image pickup apparatus according to claim 15, wherein said image pickup apparatus comprises the flash apparatus.

18. An image pickup apparatus for use with a flash apparatus, comprising:
a color adjusting circuit which controls at least one of hue and color saturation; and
a color control circuit which controls said color adjusting circuit such that when a flash apparatus is used, said color adjusting circuit corrects at least one of the hue and the color saturation responsive to illuminance of light incident from a subject using said flash apparatus independently of hue and/or color saturation control in accordance with white balance.

19. An image pickup apparatus according to claim 18, wherein said color controlling circuit has correction data associated with hue or color saturation employed when the flash apparatus is used and also has correction data associated with the hue or color saturation employed when the flash apparatus is not used, and wherein said hue correcting circuit selects proper correction data on the basis of whether the flash apparatus is used or not.

20. An image pickup apparatus according to claim 18, wherein said image pickup apparatus comprises the flash apparatus.

21. An image pickup apparatus according to claim 18, wherein the illuminating state of said flash apparatus to a subject comprises an amount of light generated by the flash apparatus.

22. An image pickup apparatus according to claim 18, wherein the illuminating state of said flash apparatus to a subject comprises an illuminance of the subject.

23. An image pickup apparatus for use with a flash apparatus, comprising:
a color adjusting circuit which controls at least one of hue and color saturation;
a flash control circuit which controls an amount of light generated by the flash apparatus in accordance with a illuminance of light incident form a subject; and
a color control circuit which changes between first data for said color adjusting circuit when the flash apparatus is not used and second data for said color adjusting circuit when the flash apparatus is used, in response to said flash control circuit, wherein said color adjusting circuit corrects at least one of hue and color saturation in response to said color control circuit.

24. An image pickup apparatus for use with a flash apparatus, comprising:

a white balance controlling circuit which controls white balance in accordance with color temperature;

a color adjusting circuit which controls hue or color saturation in accordance with a first correction value in accordance with the white balance; and a color control circuit which further controls at least one of hue and the color saturation, after said color adjusting circuit has adjusted the hue or color saturation, in accordance with a second correction value, the second correction value being determined on a basis of an amount of light generated by the flash apparatus.

25. An image pickup apparatus for use with a flash apparatus, comprising:

a color adjusting circuit which controls at least one of hue and color saturation; and a color control circuit for changing said color adjusting circuit such that said color adjusting circuit corrects at least one of hue and color saturation in response to first data when a flash apparatus is used and in response to second data when the flash apparatus is not used, independently of hue and/or color saturation control in accordance with white balance.

26. An image pickup apparatus for use with a flash apparatus, comprising:

a color temperature detecting circuit which detects a color temperature of a subject;

an illuminance detecting circuit which detects the illuminance of a subject; and a color adjusting circuit which controls at least one of hue and color saturation, wherein said color adjusting circuit controls at least one of hue and color saturation in accordance with a first correction value obtained on a basis of the color temperature detected by said color temperature detecting circuit and a second correction value obtained on a basis of at least one of the illuminance of a subject detected by said illuminance detecting circuit and an amount of light generated by the flash apparatus when the flash apparatus is used.

* * * * *

UNITED STATES PATENT AND TRADEMARK OFFICE
CERTIFICATE OF CORRECTION

PATENT NO. : 6,963,362 B1
APPLICATION NO. : 09/361152
DATED : November 8, 2005
INVENTOR(S) : Satoshi Nakayama It is certified that error appears in the above-identified patent and that said Letters Patent is hereby corrected as shown below:

On Title Page
At Item (56), Foreign Patent Documents,
    "JP 61128694    6/1986
    JP 06130470    5/1994
    JP 07240929    9/1995"
should read
    --JP 61-128694    6/1986
    JP 06-130470    5/1994
    JP 07-240929    9/1995--.

IN THE DRAWINGS
Sheet 3, Fig. 3D, "JUSTMENT" should read --ADJUSTMENT--.

COLUMN 2
Line 46, "a" should read --$\alpha$--.

COLUMN 8
Line 14, "depending" should read --depending on--.

COLUMN 12
Line 63, "a" should read --an--.
Line 64, "form" should read --from--.

Signed and Sealed this

Twenty-second Day of August, 2006

JON W. DUDAS
*Director of the United States Patent and Trademark Office*